(12) United States Patent
Nakatsuka et al.

(10) Patent No.: US 10,956,098 B2
(45) Date of Patent: Mar. 23, 2021

(54) IMAGE FORMING SYSTEM AND IMAGE FORMING APPARATUS

(71) Applicant: KYOCERA Document Solutions Inc., Osaka (JP)

(72) Inventors: Shinji Nakatsuka, Osaka (JP); Makoto Kowaka, Osaka (JP); Hironori Okamoto, Osaka (JP); Kentaro Kishida, Osaka (JP); Koichiro Tazuke, Osaka (JP); Masakazu Yamamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/665,493

(22) Filed: Oct. 28, 2019

(65) Prior Publication Data

US 2020/0133589 A1 Apr. 30, 2020

(30) Foreign Application Priority Data

Oct. 30, 2018 (JP) .............................. JP2018-203861

(51) Int. Cl.
*G06F 3/12* (2006.01)
(52) U.S. Cl.
CPC ............ *G06F 3/121* (2013.01); *G06F 3/1234* (2013.01); *G06F 3/1292* (2013.01)
(58) Field of Classification Search
CPC ....................................................... G06F 3/121
USPC ....................................................... 358/1.14
See application file for complete search history.

(56) References Cited

U.S. PATENT DOCUMENTS

| | | | |
|---|---|---|---|
| 2012/0147420 A1* | 6/2012 | Nishimi | G06F 3/1204 358/1.15 |
| 2014/0211246 A1* | 7/2014 | Okuno | H04L 67/18 358/1.15 |
| 2016/0187828 A1* | 6/2016 | Fukami | G03G 15/55 399/81 |

FOREIGN PATENT DOCUMENTS

JP 2003150362 A 5/2003

\* cited by examiner

*Primary Examiner* — Jacky X Zheng
(74) *Attorney, Agent, or Firm* — Studebaker & Brackett PC

(57) ABSTRACT

An image forming system includes a plurality of processing apparatuses. An image forming apparatus includes an image forming section, storage, an acquiring section, a first specifying section, a receiver, a second specifying section, and a notifying section. The storage stores therein a position of each of the processing apparatuses. The acquiring section acquires state information from each of the processing apparatuses. The state information indicates whether a corresponding one of the processing apparatuses is in a normal function state or a malfunction state. The first specifying section specifies, from among the processing apparatuses, a malfunctioning processing apparatus for which the malfunction state is indicated by the state information. The second specifying section specifies a relative position of the malfunctioning processing apparatus with respect to a mobile terminal device. The notifying section notifies of specific information relating to the relative position specified by the second specifying section.

9 Claims, 8 Drawing Sheets

IMAGE FORMING SYSTEM AND IMAGE FORMING APPARATUS

INCORPORATION BY REFERENCE

The present application claims priority under 35 U.S.C. § 119 to Japanese Patent Application No. 2018-203861, filed on Oct. 30, 2018. The contents of this application are incorporated herein by reference in their entirety.

BACKGROUND

The present disclosure relates to an image forming system and an image forming apparatus.

A printing system has been disclosed which simplifies work. The printing system includes a printer and a mobile terminal device. The mobile terminal device includes a printer state selection acquiring section, a printer state selection confirming section, and a display section. The printer state selection acquiring section acquires a printer state. The printer state selection confirming section causes the display section of the mobile terminal device to display the printer state. The printer state indicates that paper is depleted or jammed, for example.

SUMMARY

An image forming system according to an aspect of the present disclosure includes a plurality of processing apparatuses. The processing apparatuses process a sheet. One of the processing apparatuses is an image forming apparatus. The image forming apparatus includes an image forming section, storage, an acquiring section, a first specifying section, a receiver, a second specifying section, and a notifying section. The image forming section forms an image on the sheet. The storage stores therein a position of each of the processing apparatuses. The acquiring section acquires state information from each of the processing apparatuses. The state information indicates whether a corresponding one of the processing apparatuses is in a normal function state or a malfunction state. The first specifying section specifies, from among the processing apparatuses, a malfunctioning processing apparatus for which the malfunction state is indicated by the state information. The receiver receives position information indicating a position of a mobile terminal device from the mobile terminal device. The second specifying section specifies a relative position of the malfunctioning processing apparatus with respect to the mobile terminal device. The notifying section notifies of specific information relating to the relative position specified by the second specifying section.

An image forming apparatus according to another aspect of the present disclosure is one of a plurality of processing apparatuses which process a sheet. The image forming apparatus includes an image forming section, storage, an acquiring section, a first specifying section, a receiver, a second specifying section, and a notifying section. The image forming section forms an image on the sheet. The storage stores therein a position of each of the processing apparatuses. The acquiring section acquires state information from each of the processing apparatuses. The state information indicates whether a corresponding one of the processing apparatuses is in the normal function state or the malfunction state. The first specifying section specifies, from among the processing apparatuses, a malfunctioning processing apparatus for which the malfunction state is indicated by the state information. The receiver receives position information indicating a position of a mobile terminal device from the mobile terminal device. The second specifying section specifies a relative position of the malfunctioning processing apparatus with respect to the mobile terminal device. The notifying section notifies of specific information relating to the relative position specified by the second specifying section.

DETAILED DESCRIPTION

Figure 1:
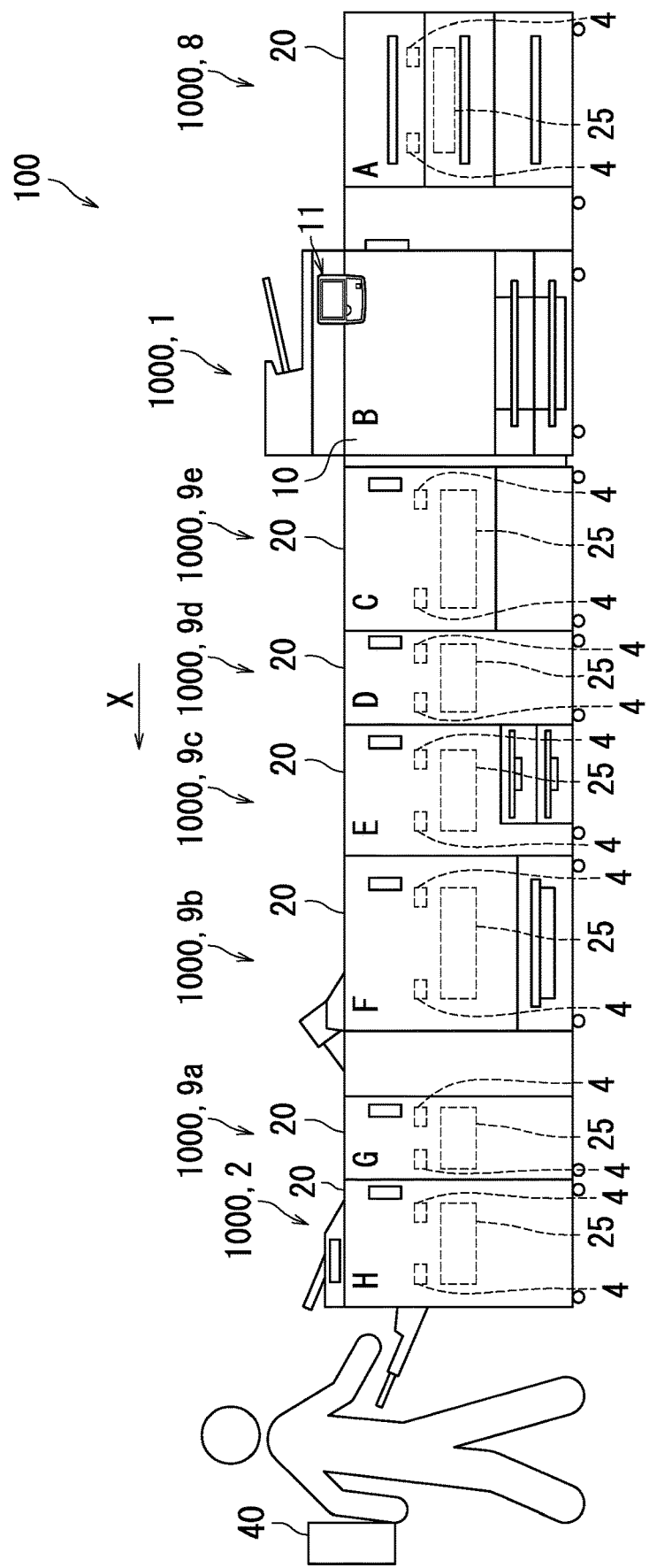
FIG. 1 is a diagram illustrating an image forming system according to a first embodiment of the present disclosure.

The following describes embodiments of an image forming system according to the present disclosure with reference to the accompanying drawings. Elements that are the same or equivalent are labeled with the same reference signs in the drawings and description thereof is not repeated.

[First Embodiment]

An image forming system 100 according to a first embodiment of the present disclosure is described with reference to FIG. 1. FIG. 1 is a diagram illustrating the image forming system 100 according to the first embodiment.

As illustrated in FIG. 1, the image forming system 100 includes a plurality of processing apparatuses 1000 and a mobile terminal device 40. The processing apparatuses 1000 process sheets. The mobile terminal device 40 is carried by a user. The mobile terminal device 40 is for example a mobile device such as a smartphone or a tablet terminal. The mobile terminal device 40 wirelessly communicates with an image forming apparatus 1.

One of the processing apparatuses 1000 is the image forming apparatus 1. For example, the processing apparatuses 1000 include the image forming apparatus 1, a post-processing apparatus 2, a plurality (five, for example) of binding apparatuses 9a to 9e, and a feeder apparatus 8. The image forming apparatus 1, the post-processing apparatus 2, the binding apparatuses 9a to 9e, and the feeder apparatus 8 are connected in a series. The sheets are conveyed in a conveyance direction X. The sheets are paper or synthetic resin sheets, for example. The image forming apparatus 1, the post-processing apparatus 2, the binding apparatuses 9a to 9e, and the feeder apparatus 8 have different identifiers.

For example, the feeder apparatus 8 located first from an upstream side in the conveyance direction X has an identifier "A". The image forming apparatus 1 located second from the upstream side in the conveyance direction X has an identifier "B". The binding apparatus 9a located third from the upstream side in the conveyance direction X has an identifier "C". That is, identifiers are assigned to the processing apparatuses 1000 in order from the upstream side to a downstream side in the conveyance direction X.

The image forming apparatus 1 forms an image on a sheet. The image forming apparatus 1 includes a casing 10 and an operation panel 11. The operation panel 11 receives touch operation by the user. Upon receiving touch operation by the user, the operation panel 11 outputs an operation signal indicating the touch operation from the user. The operation panel 11 is located on a side surface of the casing 10.

The feeder apparatus 8 feeds sheets to the image forming apparatus 1. The feeder apparatus 8 is an optional apparatus such as a large-scale feeding deck. The feeder apparatus 8 includes a casing 20, a conveyor mechanism 25, and a cassette. The conveyor mechanism 25 and the cassette are located inside the casing 20. The cassette houses a plurality of sheets.

The conveyor mechanism 25 conveys the sheets from the cassette to the image forming apparatus 1 a sheet at a time. The conveyor mechanism 25 includes a plurality of conveyance rollers and guide members.

The binding apparatuses 9a to 9e perform binding on sheets with images formed thereon by the image forming apparatus 1. Each of the binding apparatuses 9a to 9e includes a casing 20 and a conveyor mechanism 25. The conveyor mechanism 25 is located inside the casing 20. The conveyor mechanism 25 conveys the sheets from the image forming apparatus 1 a sheet at a time. The conveyor mechanism 25 includes a plurality of conveyance rollers and guide members.

The post-processing apparatus 2 performs post-processing on sheets which have undergone binding by the binding apparatus 9e. The post-processing includes punching processing, shift processing, and stapling processing, for example. The post-processing apparatus 2 includes a casing 20 and a conveyor mechanism 25. The conveyor mechanism 25 is located inside the casing 20. The conveyor mechanism 25 conveys the sheets from the binding apparatus 9e a sheet at a time. The conveyor mechanism 25 includes a plurality of conveyance rollers and guide members.

The post-processing apparatus 2, the binding apparatuses 9a to 9e, and the feeder apparatus 8 each include a plurality of sheet sensors 4 in addition to the casing 20 and the conveyor mechanism 25.

Each sheet sensor 4 detects that a jam has occurred in a corresponding one of the conveyor mechanisms 25. Specifically, the sheet sensor 4 outputs a detection signal indicating presence or absence of a sheet. Examples of the sheet sensor 4 include a thru-beam sensor and a reflective sensor. Therefore, according to the first embodiment, the post-processing apparatus 2, the binding apparatuses 9a to 9e, and the feeder apparatus 8 can each detect that a jam has occurred because the sheet sensors 4 are provided.

Figure 2:
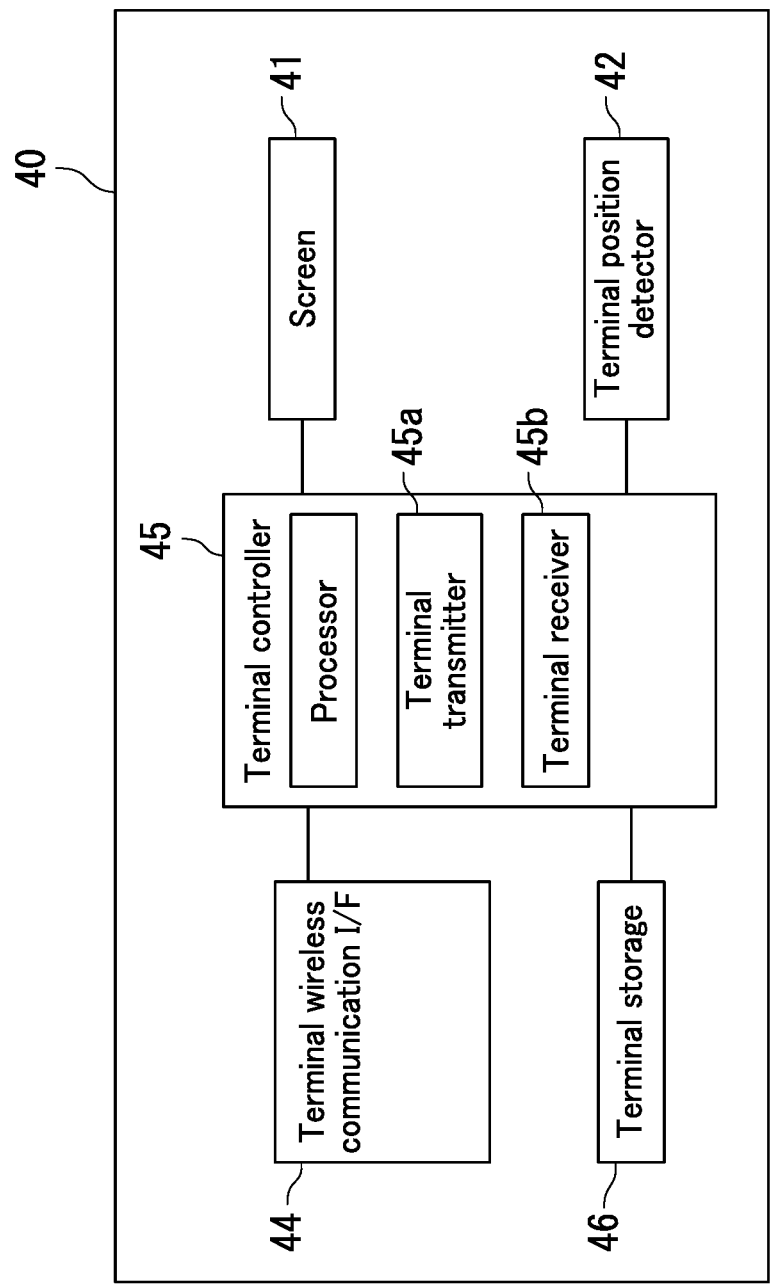
FIG. 2 is a block diagram illustrating a configuration of a mobile terminal device according to the first embodiment.

Continuing, the mobile terminal device 40 is described with reference to FIG. 2. FIG. 2 is a block diagram illustrating a configuration of the mobile terminal device 40 according to the first embodiment.

As illustrated in FIG. 2, the mobile terminal device 40 includes a screen 41, a terminal position detector 42, a terminal wireless communication interface (I/F) 44, a terminal controller 45, and terminal storage 46. The screen 41 is an example of a display section.

The screen 41 is a liquid-crystal display, for example. The screen 41 may also be an organic electroluminescent (EL) display.

The terminal position detector 42 is a Global Positioning System (GPS) receiver, for example. The terminal position detector 42 receives radio waves from GPS satellites to acquire position information. The position information indicates the longitude and latitude at which the mobile terminal device 40 is positioned.

The terminal wireless communication I/F 44 is used for wireless communication with the image forming apparatus 1. The method of wireless communication is not particularly limited, and for example a short-range wireless communication method such as BLUETOOTH (registered trademark) may be employed.

The terminal storage 46 stores a program and position information therein. Examples of the terminal storage 46 include random-access memory (RAM), read-only memory (ROM), and a hard disk drive (HDD) with a magnetic disk.

The terminal controller 45 performs various processing such as numerical computation, information processing, and machine control by executing the program stored in the terminal storage 46. The terminal controller 45 may include a processor such as a central processing unit (CPU) or a microprocessing unit (MPU). The processor of the terminal controller 45 functions as a terminal transmitter 45a and a terminal receiver 45b by executing the program stored in the terminal storage 46.

Upon being wirelessly connected to the image forming apparatus 1, the terminal transmitter 45a transmits the position information to the image forming apparatus 1. The terminal receiver 45b receives specific information from the image forming apparatus 1. When the terminal receiver 45b receives the specific information, the screen 41 displays an image exhibiting the specific information. Therefore, according to the first embodiment, the user can confirm the specific information through the carried mobile terminal device 40.

Figure 3:
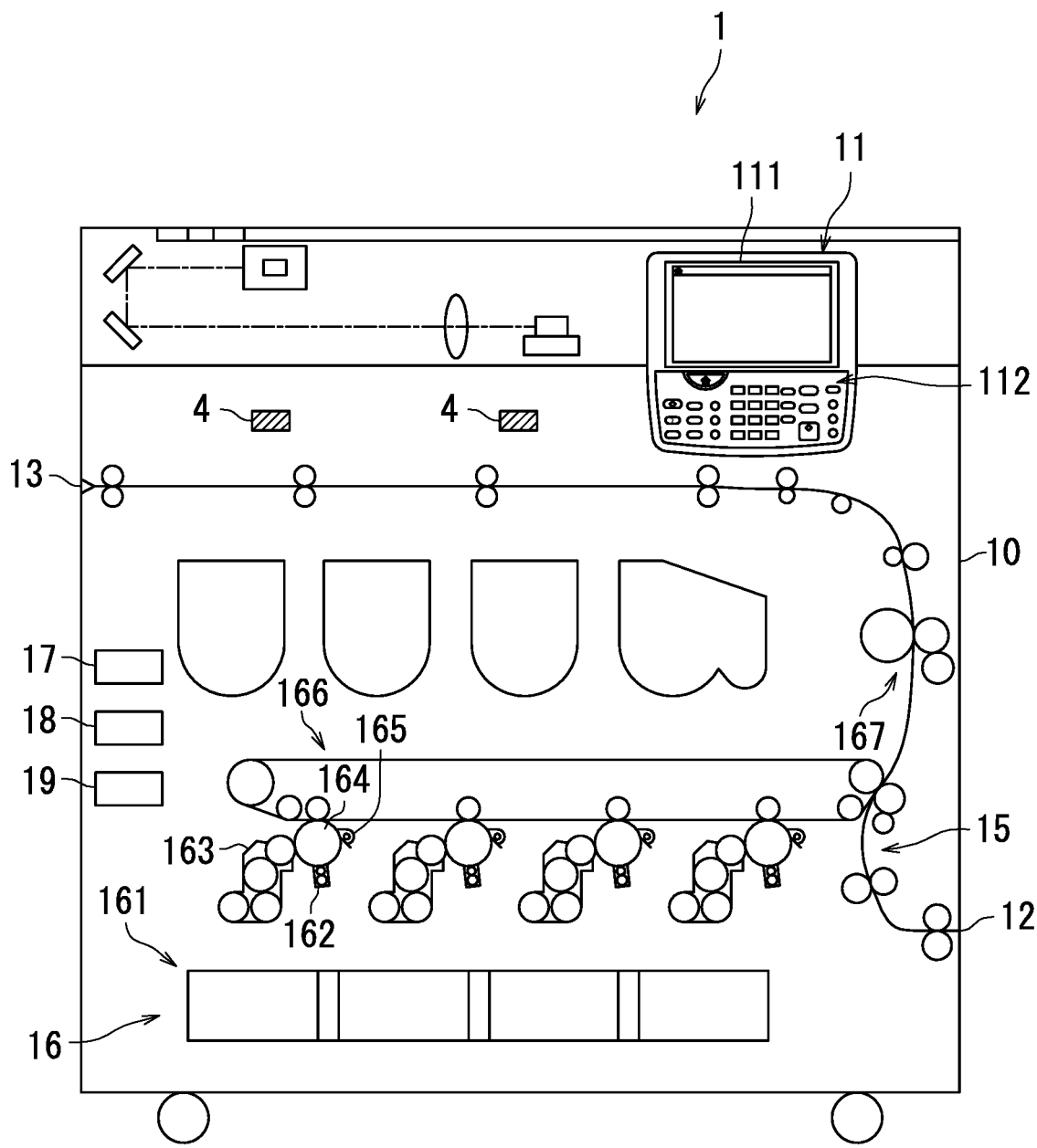
FIG. 3 is a schematic cross-sectional view illustrating an image forming apparatus according to the first embodiment.

Next, the image forming apparatus 1 according to the first embodiment is described with reference to FIG. 3. FIG. 3 is a schematic cross-sectional view illustrating the image forming apparatus 1 according to the first embodiment.

As illustrated in FIG. 3, the image forming apparatus 1 includes a conveyor mechanism 15, an image forming section 16, storage 17, a controller 18, and a wireless communication I/F 19 in addition to the casing 10 and the operation panel 11.

The operation panel 11 has a touch display 111 and a plurality of keys 112.

The touch display 111 has a display and a touch sensor. The display displays various screens. Examples of the display include a liquid-crystal display or an organic EL display. The touch sensor detects a touch by a detection target. The touch sensor outputs a touch signal indicating that a touch by a detection target has been detected. The detection target is a finger of the user, for example. The touch sensor is a resistive film type touch sensor, for example. The keys 112 include a numeric keypad, a start key, and a cancel key.

The conveyor mechanism 15 conveys sheets from a conveyance inlet 12 to an exit port 13. The sheets are conveyed by way of the image forming section 16. The conveyor mechanism 15 includes a plurality of conveyance rollers and guide members.

The image forming section 16 forms an image on a sheet. According to the first embodiment, the image forming section 16 includes a light exposure device 161, a charger 162, a development device 163, a photosensitive drum 164, a cleaner 165, a transfer device 166, and a fixing device 167, and forms an image electrographically. The light exposure device 161 forms an electrostatic latent image on the photosensitive drum 164 based on image data. The charger 162 uniformly charges the photosensitive drum 164 to a prescribed potential. The development device 163 supplies toner to the photosensitive drum 164 to develop the electrostatic latent image formed on the photosensitive drum 164. The transfer device 166 transfers a resulting toner image to the sheet. The fixing device 167 fixes the toner image to the sheet.

The wireless communication I/F 19 is used for wireless communication with the mobile terminal device 40.

The image forming apparatus 1 further includes a plurality of sheet sensors 4. The sheet sensors 4 detect occurrence of a jam in the conveyor mechanism 15. Specifically, the sheet sensors 4 output a detection signal indicating presence or absence of a sheet. Therefore, according to the first embodiment, the occurrence of a jam in the image forming apparatus 1 can be detected because the sheet sensors 4 are provided.

Figure 4:
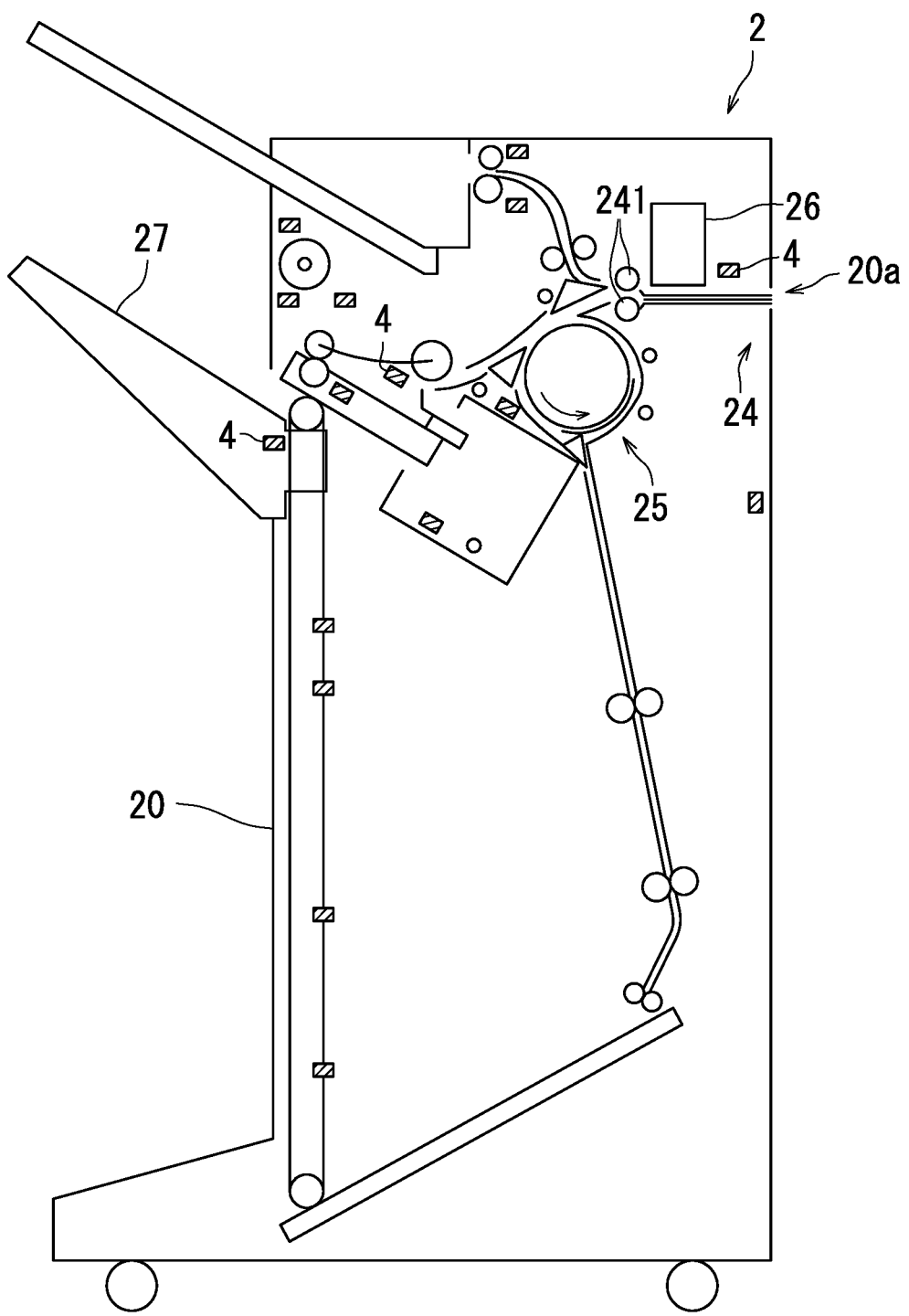
FIG. 4 is a schematic cross-sectional view illustrating a post-processing apparatus according to the first embodiment.

Continuing, the post-processing apparatus 2 according to the first embodiment is described in detail with reference to FIG. 4. FIG. 4 is a schematic cross-sectional view illustrating the post-processing apparatus 2 according to the first embodiment.

As illustrated in FIG. 4, the post-processing apparatus 2 includes an intake section 24, a post-processing section 26, and an exit tray 27 in addition to the sheet sensors 4, the casing 20, and the conveyor mechanism 25. The sheet sensors 4, the intake section 24, the conveyor mechanism 25, and the post-processing section 26 are located inside the casing 20.

The post-processing section 26 performs stapling processing using staples.

A sheet is conveyed into the intake section 24 through a conveyance inlet 20a. The conveyance inlet 20a is provided on a side surface of the casing 20.

The intake section 24 includes intake rollers 241. The intake rollers 241 convey the sheet from the conveyance inlet 20a to the conveyor mechanism 25.

The conveyor mechanism 25 conveys the sheet from the intake section 24 to the exit tray 27. The sheet is conveyed by way of the post-processing section 26. The conveyor mechanism 25 includes a plurality of rollers and guide members.

Figure 5:
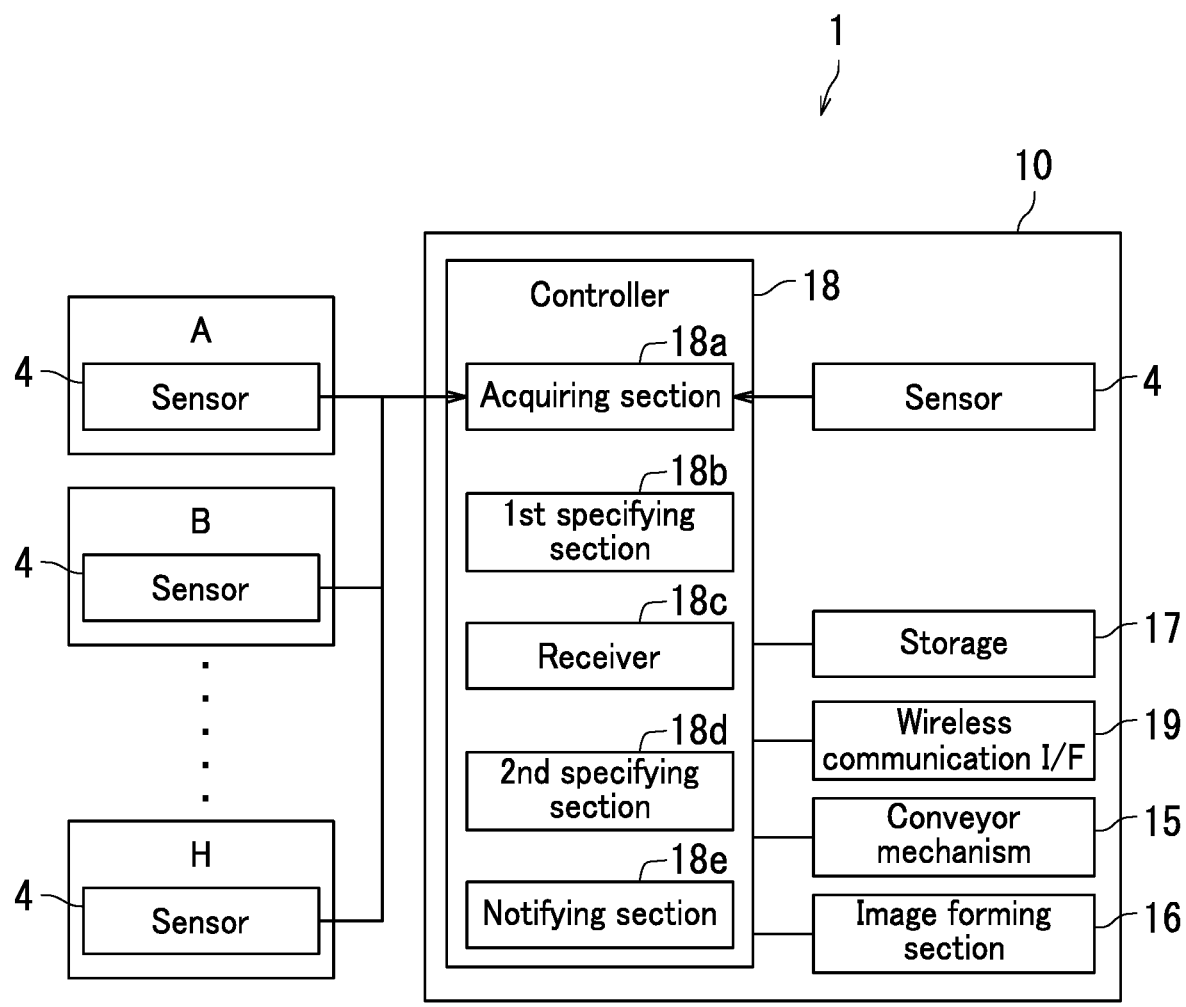
FIG. 5 is a block diagram illustrating the configuration of the image forming apparatus.

Next, the image forming apparatus 1 is further described with reference to FIG. 5. FIG. 5 is a block diagram illustrating the configuration of the image forming apparatus 1 according to the first embodiment.

As illustrated in FIG. 5, the sheet sensors 4, the conveyor mechanism 15, the image forming section 16, the storage 17, the controller 18, and the wireless communication I/F 19 are included inside the casing 10 of the image forming apparatus 1.

The storage 17 stores a program and apparatus position information therein. The storage 17 includes a storage device and semiconductor memory. The storage device includes either or both of an HDD and a solid-state drive (SSD), for example. Examples of the semiconductor memory include RAM and ROM.

The apparatus position information indicates a position of each of the processing apparatuses 1000. For example, the apparatus position information indicates the respective longitudes and latitudes at which the image forming apparatus 1, the post-processing apparatus 2, the binding apparatuses 9a to 9e, and the feeder apparatus 8 are positioned.

The controller 18 controls operation of each section of the image forming apparatus 1 by executing the program. The controller 18 is constituted by a processor such as a CPU. The controller 18 includes an integrated circuit for image formation processing. Examples of the integrated circuit for image formation processing include an application-specific integrated circuit (ASIC). The processor of the controller 18 functions as an acquiring section 18a, a first specifying section 18b, a receiver 18c, a second specifying section 18d, and a notifying section 18e by executing the program stored in the storage 17.

The acquiring section 18a acquires state information from each of the processing apparatuses 1000. The state information indicates whether the processing apparatuses 1000 each are in a normal function state or a malfunction state. Specifically, the normal function state is a state in which a jam has not occurred in a processing apparatus 1000. By contrast, the malfunction state is a state in which a jam has occurred in a processing apparatus 1000. In detail, the acquiring section 18a acquires detection signals output by the sheet sensors 4 provided in the image forming apparatus 1. Similarly, the acquiring section 18a acquires detection signals output by the sheet sensors 4 provided in the post-processing apparatus 2, the binding apparatuses 9a to 9e, and the feeder apparatus 8. Therefore, according to the first embodiment, the image forming apparatus 1 can acquire state information indicating whether the image forming apparatus 1, the post-processing apparatus 2, the binding apparatuses 9a to 9e, and the feeder apparatus 8 are each in the normal function state or the malfunction state.

The first specifying section 18b specifies, from among the processing apparatuses 1000, any malfunctioning processing apparatuses for which the malfunction state is indicated by the state information. Specifically, the first specifying section 18b determines whether the image forming apparatus 1 is in the normal function state or the malfunction state based on the detection signal output by the sheet sensors 4 provided in the image forming apparatus 1. For example, the first specifying section 18b determines whether or not a jam has occurred by specifying the position of a sheet based on the conveyance speed of the sheet and time when the leading edge of the sheet has passed each sheet sensor 4. When the first specifying section 18b has determined that a jam has occurred, the first specifying section 18b discerns that the image forming apparatus 1 is a malfunctioning processing apparatus. When the first specifying section 18b has determined that a jam has not occurred by contrast, the first specifying section 18b discerns that the image forming apparatus 1 is in the normal function state. Similarly, the first specifying section 18b discerns whether or not the post-processing apparatus 2, the binding apparatuses 9a to 9e, and the feeder apparatus 8 are malfunctioning processing apparatuses.

The receiver 18c receives position information from the mobile terminal device 40 upon being wirelessly connected to the mobile terminal device 40.

The second specifying section 18d specifies the relative position of a malfunctioning processing apparatus with respect to the mobile terminal device 40. In detail, the second specifying section 18d specifies the relative position of a malfunctioning processing apparatus with respect to the mobile terminal device 40 based on the position of the mobile terminal device 40 and the position of the malfunctioning processing apparatus. Specifically, the second specifying section 18*d* specifies the relative position of the malfunctioning processing apparatus with respect to the mobile terminal device 40 based on the longitude and latitude at which the mobile terminal device 40 is positioned and the longitude and latitude at which the malfunctioning processing apparatus is positioned.

In the image forming system 100, it is possible for a jam to occur in two or more processing apparatuses 1000 simultaneously.

When the first specifying section 18*b* has specified two or more malfunctioning processing apparatuses, the second specifying section 18*d* also specifies the position of the malfunctioning processing apparatus which is closest to the mobile terminal device 40 among the two or more malfunctioning processing apparatuses. In the following, a "malfunctioning processing apparatus which is closest to the mobile terminal device 40" may be referred to as a "proximate apparatus".

The notifying section 18*e* notifies of specific information relating to the relative position specified by the second specifying section 18*d*. For example, the notifying section 18*e* transmits the specific information to the mobile terminal device 40. The specific information includes the position of the malfunctioning processing apparatus which is closest to the mobile terminal device 40. For example, when the identifier of the proximate apparatus is "C", the specific information indicates the identifier "C".

Also, for example, a situation is described in which the user is in the vicinity of a processing apparatus 1000 with the identifier "C" when there are two malfunctioning processing apparatuses: a processing apparatus 1000 with the identifier "A" and a processing apparatus 1000 with the identifier "C". Supposing that the malfunction state of the processing apparatus 1000 with the identifier "A" is displayed by the mobile terminal device 40 before the malfunction of the processing apparatus 1000 with the identifier "C" is displayed by the mobile terminal device 40, the user must move back and forth between the processing apparatus 1000 with the identifier "C" and the processing apparatus 1000 with the identifier "A".

However, according to the first embodiment, the user can initially discern that the processing apparatus 1000 with the identifier "C" is in the malfunction state. When there are two or more malfunctioning processing apparatuses, the processing apparatus 1000 with the identifier "C" is closest to the mobile terminal device 40 among the two or more malfunctioning processing apparatuses. As a result, the user need not move back and forth between the processing apparatus 1000 with the identifier "A" and the processing apparatus 1000 with the identifier "C". Therefore, the user can efficiently perform work to resolve malfunction of the processing apparatuses 1000. When the mobile terminal device 40 receives specific information, the screen 41 displays an image exhibiting the specific information. Therefore, according to the first embodiment, the user can confirm specific information with the carried mobile terminal device 40.

Figure 6:
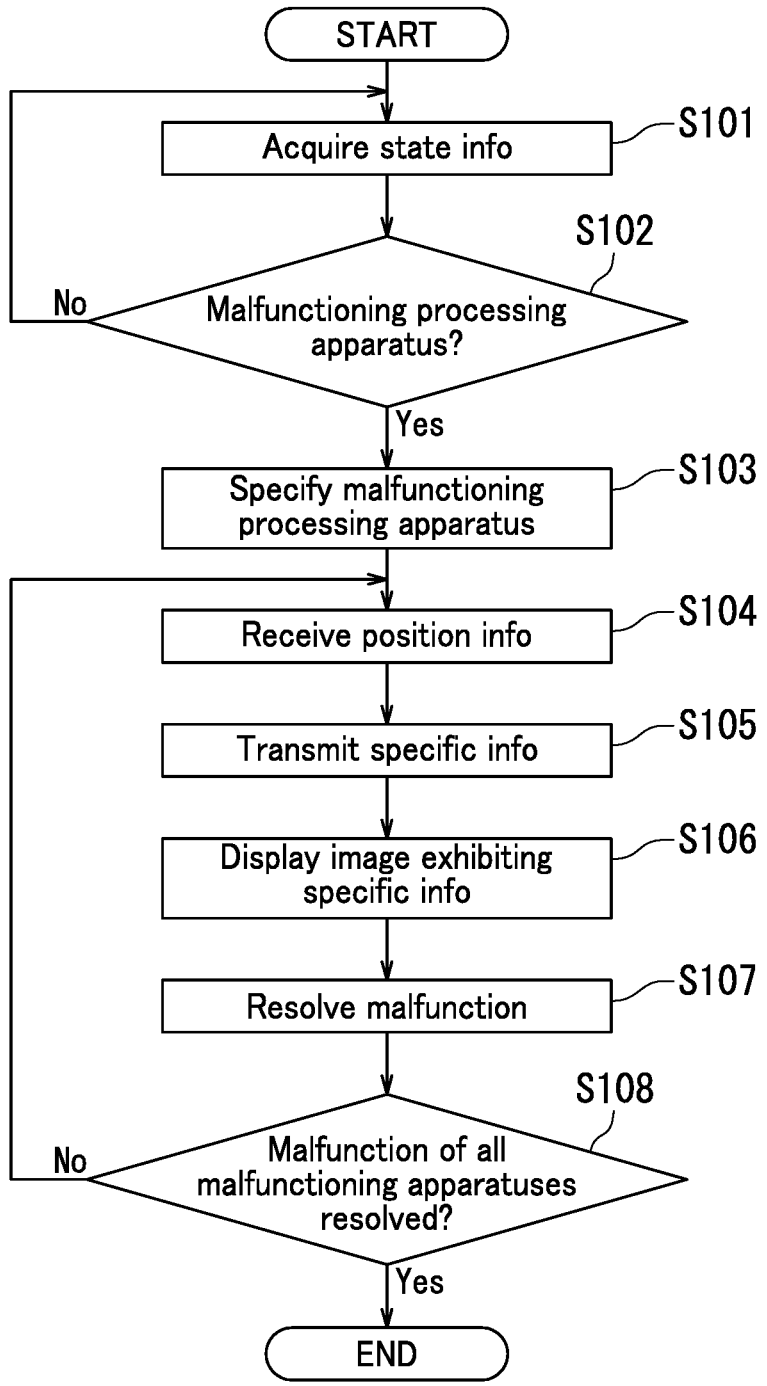
FIG. 6 is a flowchart depicting a malfunction resolution method according to the first embodiment.

Next, a malfunction resolution method performed by the image forming system 100 according to the first embodiment is described with reference to FIG. 6. FIG. 6 is a flowchart depicting the malfunction resolution method performed by the image forming system 100 according to the first embodiment.

As illustrated in FIG. 6, the malfunction resolution method includes Steps S101 to S108.

In Step S101, the acquiring section 18*a* acquires state information from the processing apparatuses 1000. The process then advances to Step S102.

In Step S102, the first specifying section 18*b* determines whether or not there are any malfunctioning processing apparatuses among the processing apparatuses 1000 based on the state information. When there are no malfunctioning processing apparatuses (No in Step S102), the process returns to Step S101. When there are one or more malfunctioning processing apparatuses by contrast (Yes in Step S102), the process advances to Step S103.

In Step S103, the first specifying section 18*b* specifies, from among the processing apparatuses 1000, any malfunctioning processing apparatuses for which malfunction is indicated by the state information. The process then advances to Step S104.

In Step S104, the receiver 18*c* receives position information from the mobile terminal device 40 upon being wirelessly connected to the mobile terminal device 40. The process then advances to Step S105.

In Step S105, the second specifying section 18*d* specifies the relative position of each malfunctioning processing apparatus with respect to the mobile terminal device 40. The notifying section 18*e* transmits, to the mobile terminal device 40, specific information relating to the relative position specified by the second specifying section 18*d*. The process then advances to Step S106.

In Step S106, when the terminal receiver 45*b* receives the specific information, the screen 41 displays an image exhibiting the specific information. The process then advances to Step S107.

In Step S107, the user resolves the malfunction of the malfunctioning processing apparatus. When the user resolves the malfunction of the malfunctioning processing apparatus, the sheet sensors 4 of the malfunctioning processing apparatus output detection signals indicating presence or absence of a sheet. The process then advances to Step S108.

In Step S108, the first specifying section 18*b* determines whether or not malfunction of every malfunctioning processing apparatus has been resolved based on the detection signals. When malfunction of not every malfunctioning processing apparatus has been resolved (No in Step S108), the process returns to Step S104. When malfunction of every malfunctioning processing apparatus has been resolved by contrast (Yes in Step S108), the process ends.

Figure 7A:
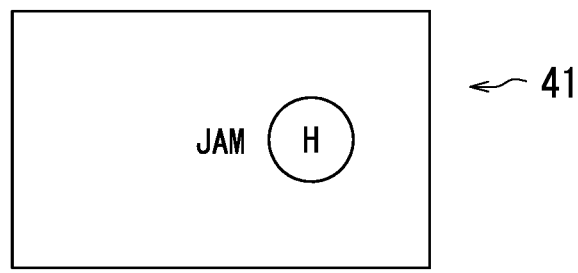
FIG. 7A is a diagram illustrating specific information initially displayed on the mobile terminal device.
Figure 7B:
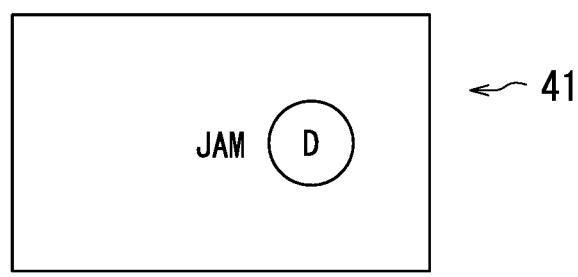
FIG. 7B is a diagram illustrating specific information displayed after the display in FIG. 7A.
Figure 7C:
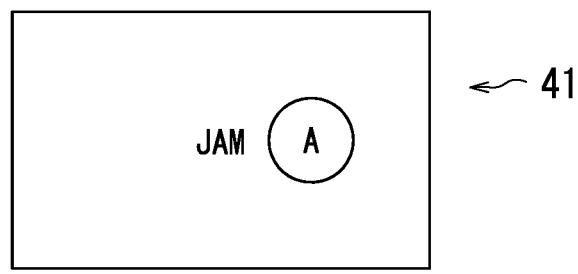
FIG. 7C is a diagram illustrating specific information displayed after the display in FIG. 7B.
Figure 7D:
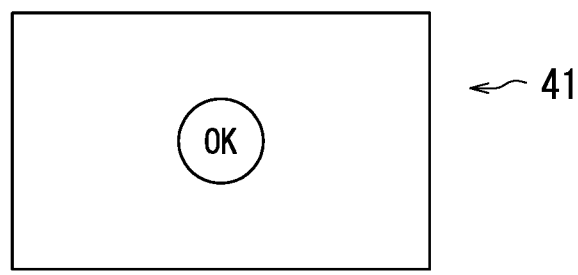
FIG. 7D is a diagram illustrating specific information displayed after the display in FIG. 7C.

Continuing, the malfunction resolution method is specifically described with reference to FIGS. 7A to 7D. FIGS. 7A to 7D are diagrams illustrating specific information displayed by the mobile terminal device 40. In detail, FIG. 7A is a diagram illustrating initially displayed specific information. FIG. 7B is a diagram illustrating specific information displayed after the display in FIG. 7A. FIG. 7C is a diagram illustrating specific information displayed after the display in FIG. 7B. FIG. 7D is a diagram illustrating specific information displayed after the display in FIG. 7C. According to the first embodiment, a case is described in which the first specifying section 18*b* has specified that the processing apparatus 1000 with the identifier "A", a processing apparatus 1000 with the identifier "D", and a processing apparatus 1000 with the identifier "H" are malfunctioning processing apparatuses among the processing apparatuses 1000.

The user is in the vicinity of the processing apparatus 1000 with the identifier "H". That is, the processing apparatus 1000 with the identifier "H" is closest to the mobile terminal device 40 among the processing apparatus 1000 with the identifier "A", the processing apparatus 1000 with the identifier "D", and the processing apparatus 1000 with the identifier "H". As a result, as illustrated in FIG. 7A, the terminal receiver 45b of the mobile terminal device 40 causes the screen 41 to display specific information indicating the identifier "H". The user discerns that the processing apparatus 1000 with the identifier "H" is in the malfunction state. The user resolves the malfunction of the processing apparatus 1000 with the identifier "H" which is in front of the user.

When the state information of the proximate apparatus (the processing apparatus 1000 with the identifier "H") indicates the normal function state after the notifying section 18e has transmitted the specific information indicating the position of the processing apparatus 1000 with the identifier "H" to the mobile terminal device 40, the notifying section 18e transmits specific information indicating the position of a malfunctioning processing apparatus which is closest to the mobile terminal device 40. For example, because the user has performed work to resolve the malfunction of the processing apparatus 1000 with the identifier "H", the user is in the vicinity of the processing apparatus 1000 with the identifier "H".

The receiver 18c receives the position information from the mobile terminal device 40, and the second specifying section 18d specifies the position of a malfunctioning processing apparatus which is closest to the mobile terminal device 40 among the malfunctioning processing apparatuses other than the malfunctioning processing apparatus for which the normal function state is indicated by the state information. Specifically, the second specifying section 18d specifies that the processing apparatus 1000 with the identifier "D" is closest to the mobile terminal device 40 among the processing apparatus 1000 with the identifier "A" and the processing apparatus 1000 with the identifier "D".

As a result, as illustrated in FIG. 7B, the terminal receiver 45b of the mobile terminal device 40 causes the screen 41 to display specific information indicating the identifier "D". The user discerns that the processing apparatus 1000 with the identifier "D" is in the malfunction state. The user moves to the vicinity of the processing apparatus 1000 with the identifier "D" which is closest to the mobile terminal device 40 among the processing apparatus 1000 with the identifier "A" and the processing apparatus 1000 with the identifier "D". The user then resolves the malfunction of the processing apparatus 1000 with the identifier "D".

When the state information of the proximate apparatus (the processing apparatus 1000 with the identifier "D") indicates the normal function state after the notifying section 18e has transmitted the specific information indicating the position of the processing apparatus 1000 with the identifier "D" to the mobile terminal device 40, the notifying section 18e transmits specific information indicating the position of a malfunctioning processing apparatus which is closest to the mobile terminal device 40. For example, because the user has performed work to resolve the malfunction of the processing apparatus 1000 with the identifier "D", the user is in the vicinity of the processing apparatus 1000 with the identifier "D".

The receiver 18c receives the position information from the mobile terminal device 40, and the second specifying section 18d specifies the position of the malfunctioning processing apparatus which is closest to the mobile terminal device 40 among the malfunctioning processing apparatuses other than the malfunctioning processing apparatuses for which the normal function state is indicated by the state information. Specifically, the second specifying section 18d specifies that the processing apparatus 1000 with the identifier "A" is closest to the mobile terminal device 40.

As a result, as illustrated in FIG. 7C, the terminal receiver 45b of the mobile terminal device 40 causes the screen 41 to display specific information indicating the identifier "A". The user discerns that the processing apparatus 1000 with the identifier "A" is in the malfunction state. The user moves to the vicinity of the processing apparatus 1000 with the identifier "A". The user then resolves the malfunction of the processing apparatus 1000 with the identifier "A".

As a result, the malfunction of every malfunctioning processing apparatus is resolved among the processing apparatus 1000 with the identifier "A", the processing apparatus 1000 with the identifier "D", and the processing apparatus 1000 with the identifier "H". Then, as illustrated in FIG. 7D, the terminal receiver 45b of the mobile terminal device 40 causes the screen 41 to display specific information indicating that the malfunction of every malfunctioning processing apparatus has been resolved.

According to the first embodiment as described above with reference to FIGS. 1 to 7D, the notifying section 18e transmits an identifier indicating the position of the proximate apparatus to the mobile terminal device 40. The screen 41 displays the specific information indicating the position of the proximate apparatus. Accordingly, the user need not move back and forth between the processing apparatus 1000 with the identifier "H" and the processing apparatus 1000 with the identifier "A". As a result, the user can efficiently resolve jams in the processing apparatuses 1000.

[Second Embodiment]

Next, an image forming system 100 is described according to a second embodiment. The second embodiment differs from the first embodiment in that in the second embodiment, the notifying section 18e transmits differentiated specific information. In the following, items of the second embodiment that differ from the first embodiment are described, and description of elements which are common to those in the first embodiment is omitted.

The notifying section 18e transmits specific information in which the identifier of a malfunctioning processing apparatus which is closest to the mobile terminal device 40 is differentiated from the identifiers of malfunctioning processing apparatuses which are not closest to the mobile terminal device 40. For example, a case is described in which the first specifying section 18b has specified that the processing apparatus 1000 with the identifier "A", the processing apparatus 1000 with the identifier "D", and the processing apparatus 1000 with the identifier "H" are malfunctioning processing apparatuses. The notifying section 18e transmits specific information indicating the identifiers "A", "D", and "H". When the identifier of the malfunctioning processing apparatus which is closest to the mobile terminal device 40 is the identifier "C", only the identifier "C" is displayed as blinking or in a different color.

The second embodiment is described above. According to the second embodiment, only the identifier of the malfunctioning processing apparatus which is closest to the mobile terminal device 40 is displayed as blinking or in a different color. Accordingly, the user need not move back and forth between the processing apparatus 1000 with the identifier "H" and the processing apparatus 1000 with the identifier "A". As a result, the user can efficiently resolve jams in the processing apparatuses 1000.

[Third Embodiment]

Next, an image forming system 100 according to a third embodiment is described. The third embodiment differs from the first embodiment in that in the third embodiment, the normal function state is a state in which a consumable is not depleted in a processing apparatus 1000 and the malfunction state is a state in which a consumable is depleted in a processing apparatus 1000. In the following, items of the third embodiment that differ from the first embodiment are described, and description of elements that are common to those in the first embodiment is omitted.

Each of the processing apparatuses 1000 includes a remaining amount sensor. The remaining amount sensor detects that the consumable is depleted. Examples of the consumable include paper, toner, and staples. Specifically, the remaining amount sensor outputs a detection signal indicating presence or absence of the consumable.

The storage 17 stores a program and apparatus position information therein. The apparatus position information indicates the position of each of the processing apparatuses 1000. For example, the apparatus position information indicates the respective longitudes and latitudes at which the image forming apparatus 1, the post-processing apparatus 2, the binding apparatuses 9a to 9e, and the feeder apparatus 8 are positioned. Furthermore, the apparatus position information may include the longitude and latitude at which a reserve consumable is positioned.

The first specifying section 18b specifies, from among the processing apparatuses 1000, a malfunctioning processing apparatus for which malfunction is indicated by the state information. The first specifying section 18b determines whether the image forming apparatus 1 is in the normal function state or the malfunction state based on the detection signal output by the remaining amount sensor provided in the image forming apparatus 1. For example, the first specifying section 18b determines whether or not the consumable is depleted based on the presence or absence of the consumable. When the first specifying section 18b has determined that the consumable is depleted, the first specifying section 18b discerns that the image forming apparatus 1 is a malfunctioning processing apparatus. When the first specifying section 18b has determined that the consumable is not depleted by contrast, the first specifying section 18b discerns that the image forming apparatus 1 is not a malfunctioning processing apparatus. Similarly, the first specifying section 18b discerns whether or not the post-processing apparatus 2, the binding apparatuses 9a to 9e, and the feeder apparatus 8 are malfunctioning processing apparatuses.

The third embodiment is described above. According to the third embodiment, the notifying section 18e transmits specific information indicating the position of the proximate apparatus to the mobile terminal device 40. The screen 41 displays the specific information indicating the position of the proximate apparatus. Accordingly, the user need not move back and forth between the processing apparatus 1000 with the identifier "H" and the processing apparatus 1000 with the identifier "A". As a result, the user can efficiently resolve a depleted consumable in the processing apparatuses 1000.

Embodiments of the present disclosure are described so far with reference to the accompanying drawings. However, the present disclosure is not limited to the above embodiments and may be implemented in various manners within a scope not departing from the gist thereof. Furthermore, the configuration and values illustrated in the above embodiments are merely examples and not particular limitations. Various alterations are possible within a scope not substantially departing from the effects of the present disclosure.

Figure 8:
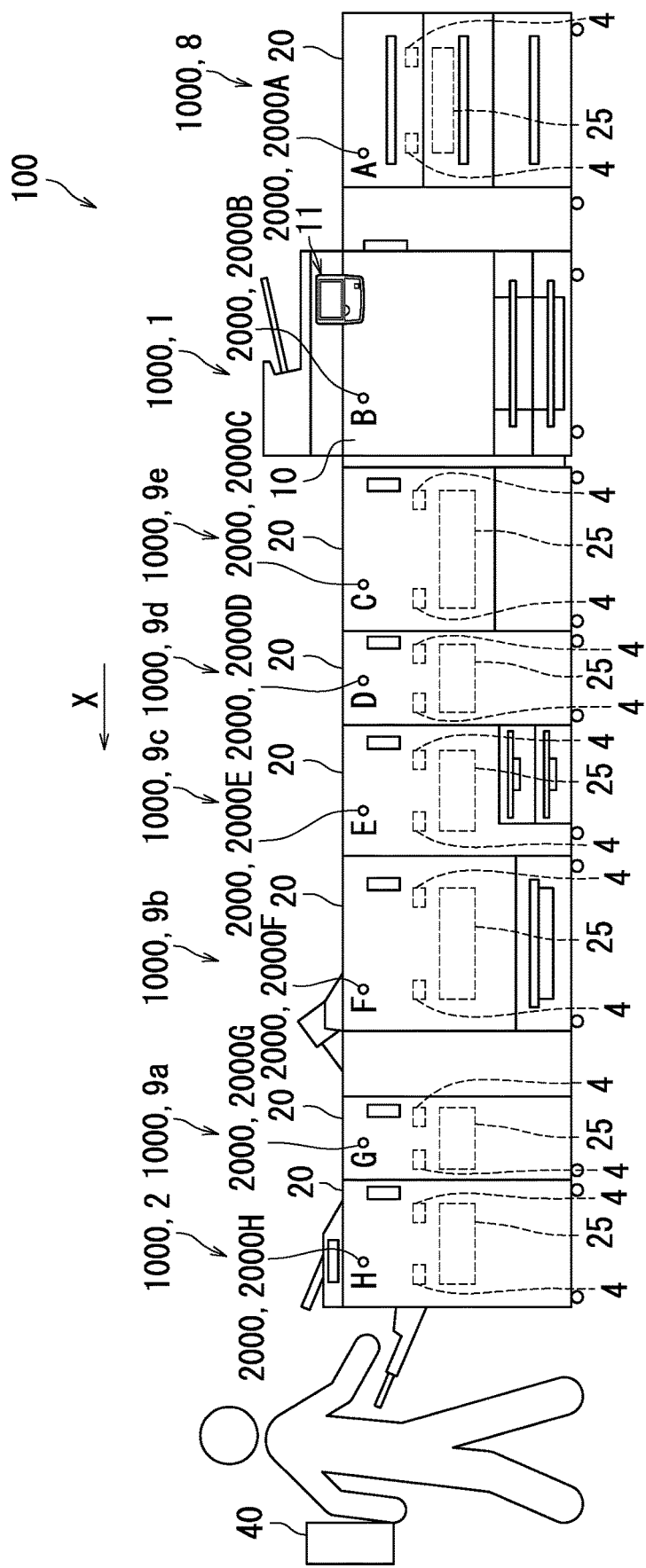
FIG. 8 is a diagram illustrating an image forming system according to another embodiment of the present disclosure.

In the image forming system 100 described above with reference to FIGS. 1 to 7D, the notifying section 18e transmits specific information to the mobile terminal device 40. However, the present disclosure is not limited as such. FIG. 8 is a diagram illustrating an image forming system 100 according to another embodiment of the present disclosure. The image forming system 100 includes a plurality of display lamps 2000. The display lamps 2000 each are an example of a display section. The display lamps 2000 are light-emitting diodes (LED), for example. The display lamps 2000 are provided in different processing apparatuses 1000. Specifically, a display lamp 2000A is provided in the processing apparatus 1000 with the identifier "A", a display lamp 2000B is provided in the processing apparatus 1000 with the identifier "B", and a display lamp 2000C is provided in the processing apparatus 1000 with the identifier "C". Also, a display lamp 2000D is provided in the processing apparatus 1000 with the identifier "D", a display lamp 2000E is provided in the processing apparatus 1000 with the identifier "E", and a display lamp 2000F is provided in the processing apparatus 1000 with the identifier "F". Furthermore, a display lamp 2000G is provided in the processing apparatus 1000 with the identifier "G" and a display lamp 2000H is provided in the processing apparatus 1000 with the identifier "H". The notifying section 18e controls the display lamps 2000 based on the specific information. For example, the notifying section 18e causes a display lamp 2000 in a malfunctioning processing apparatus which is closest to the mobile terminal device 40 to light up. As a result, the user can observe the display lamp 2000 and efficiently resolve the malfunction of processing apparatuses 1000.

According to the embodiments of the present disclosure, a case is described in which the present disclosure is applied to the electrographic image forming apparatus 1. However, the present disclosure may also be applied to an inkjet image forming apparatus, for example.

Items described in the first to third embodiments may be appropriately combined. For example, items described in the second embodiment may be combined with items described in the third embodiment.

What is claimed is:

1. An image forming system comprising
a plurality of processing apparatuses each configured to process a sheet, wherein
one of the processing apparatuses is an image forming apparatus,
the image forming apparatus includes:
an image forming section which forms an image on the sheet;
storage which stores therein a position of each of the processing apparatuses;
an acquiring section which acquires state information from each of the processing apparatuses, the state information indicating whether a corresponding one of the processing apparatuses is in a normal function state or a malfunction state;
a first specifying section which specifies, from among the processing apparatuses, a malfunctioning processing apparatus for which the malfunction state is indicated by the state information;
a receiver which receives position information indicating a position of a mobile terminal device from the mobile terminal device;
a second specifying section which specifies a relative position of the malfunctioning processing apparatus with respect to the mobile terminal device; and a notifying section which notifies of specific information relating to the relative position specified by the second specifying section, the first specifying section specifies two or more malfunctioning processing apparatuses, the second specifying section specifies a position of a malfunctioning processing apparatus which is closest to the mobile terminal device among the two or more malfunctioning processing apparatuses, and the notifying section notifies of the specific information including the position of the malfunctioning processing apparatus which is closest to the mobile terminal device.

2. The image forming system according to claim 1, wherein the notifying section transmits the specific information to the mobile terminal device.

3. The image forming system according to claim 2, further comprising the mobile terminal device, wherein
the mobile terminal device includes:
a terminal transmitter which transmits the position information to the image forming apparatus;
a terminal receiver which receives the specific information from the image forming apparatus; and
a display section which displays an image exhibiting the specific information.

4. The image forming system according to claim 1, wherein each of the processing apparatuses includes a display section, and
the notifying section controls the display section based on the specific information.

5. The image forming system according to claim 1, wherein when the state information of the malfunctioning processing apparatus which is closest to the mobile terminal device indicates the normal function state after the notifying section has notified of the specific information indicating the position of the malfunctioning processing apparatus which is closest to the mobile terminal device,
the receiver receives the position information from the mobile terminal device,
the second specifying section specifies the position of the malfunctioning processing apparatus which is closest to the mobile terminal device among the malfunctioning processing apparatuses other than the malfunctioning processing apparatus for which the normal function state is indicated by the state information, and
the notifying section notifies of the specific information indicating the position of the malfunctioning processing apparatus which is closest to the mobile terminal device.

6. The image forming system according to claim 1, wherein the processing apparatuses each have identifiers, and the specific information that the notifying section notifies of is specific information in which an identifier of the malfunctioning processing apparatus which is closest to the mobile terminal device is differentiated from an identifier of a malfunctioning processing apparatuses which are not closest to the mobile terminal device.

7. The image forming system according to claim 1, wherein the normal function state is a state in which a jam has not occurred in the corresponding one of the processing apparatuses, and
the malfunction state is a state in which a jam has occurred in the corresponding one of the processing apparatuses.

8. The image forming system according to claim 7, wherein each of the processing apparatuses includes:
a conveyor mechanism which conveys the sheet; and
a sensor which detects occurrence of a jam in the conveyor mechanism.

9. An image forming apparatus which is one of a plurality of processing apparatuses which process a sheet, the image forming apparatus comprising:

an image forming section configured to form an image on the sheet;
storage configured to store therein a position of each of the processing apparatuses;
an acquiring section configured to acquire state information from each of the processing apparatuses, the state information indicating whether a corresponding one the processing apparatuses is in a normal function state or a malfunction state;
a first specifying section configured to specify, from among the processing apparatuses, a malfunctioning processing apparatus for which the malfunction state is indicated by the state information;
a receiver configured to receive position information indicating a position of a mobile terminal device from the mobile terminal device;
a second specifying section configured to specify a relative position of the malfunctioning processing apparatus with respect to the mobile terminal device; and
a notifying section configured to notify of specific information relating to the relative position specified by the second specifying section, wherein
the first specifying section specifies two or more malfunctioning processing apparatuses,
the second specifying section specifies a position of a malfunctioning processing apparatus which is closest to the mobile terminal device among the two or more malfunctioning processing apparatuses, and
the notifying section notifies of the specific information including the position of the malfunctioning processing apparatus which is closest to the mobile terminal device.

\* \* \* \* \*